UNITED STATES PATENT OFFICE 2,549,805

REMOVAL OF OPTICS FILMING COAT

Arvid Grenstad, Port Orchard, and Robert B. Callison, Bremerton, Wash.

No Drawing. Application May 7, 1945, Serial No. 592,431

3 Claims. (Cl. 134—42)

(Granted under the act of March 3, 1883, as amended April 30, 1928; 370 O. G. 757)

This invention relates to a method and a solvent for removing reflection reducing coatings from glass used for optical purposes, such as binocular lenses and prisms, gun sights, range finders and the like.

In the art of producing glass for optical purposes, great care is taken to control grinding and polishing to fine tolerances. When the glass is to be used for work of a precise optical nature, provision has been made for accurately coating the lenses and prisms and the like with a film that materially reduces light loss otherwise occurring because of surface reflections off the glass. There are numerous materials available that may be employed in such films. Magnesium fluoride is frequently used as a film coating and is one of the preferred materials for the purpose.

It has been found that a film coating of uniform thickness of one-half (½) the wave length of light is desirable and especially effective in reducing such light loss.

Experience in the industry teaches that even though the film coating may be relatively hard and durable, it is nevertheless mechanically damageable through handling of the glass treated therewith. Furthermore, because of the closely controlled thickness of the film, it cannot be protected effectively nor easily repaired.

It will be recognized that variation in light rays reaching the optic nerves of users of optical instruments affects the image reproduced on the minds of such users and that it is of great importance to provide for transmitting as nearly true and perfect images through the optical instruments as possible. When damaged, the coatings should, therefore, be removed and a complete new coating should be applied.

Certain reagents are available that effectively act as solvents for reflection reducing films on glass of the type under consideration. However, when the film is of magnesium fluoride ($MgF_2$), one of the reaction products with most solvents is hydrofluoric acid (HF) which reacts with the glass and thereby damages it. In some cases it may be difficult to determine without relatively complicated tests whether the glass structure itself has been damaged or affected by the reaction with the reagent or the reaction products.

It is, therefore, the principal object of the present invention to provide for removing reflection reducing film coatings of magnesium fluoride from glass without damaging the glass.

Other objects of the invention are to provide for so removing film coatings from glass in a facile, economical and efficient manner, all without injury to the glass.

In accomplishing these and other objects of the present invention, we have provided improved steps in a method and arrangements of materials in a solvent, the preferred embodiments of which are hereinafter explained.

The primary feature is to provide an effective solvent for magnesium fluoride or other fluorides which does not damage glass and in which the final reaction products with fluorides do not damage glass.

*Example I*

We have found that a concentrated solution of sulfuric acid ($H_2SO_4$) is a suitable solvent for magnesium fluoride used as a reflection reducing coating on glass.

The sulfuric acid dissolves the magnesium fluoride film, the first reaction products being hydrofluoric acid (HF) and magnesium sulphate ($MgSO_4$). Normally the hydrofluoric acid would attack the glass and render it useless for optical purposes.

We have found that, in order to prevent deleterious reaction of hydrofluoric acid on the glass, it is necessary to include, as an inhibitor, some material that reacts more readily with hydrofluoric acid than does glass.

Boric acid is a suitable inhibitor for our purpose.

The term "boric acid" as used herein includes orthoboric acid, pyroboric acid, metaboric acid, tetraboric acid and other more complex poly acids of boron. The boric acid as such may be added to the solvent, or compounds of boron, which react with the solvent or other materials present to form boric acid, may be added to the solvent. Examples of such compounds of boron are the metallic salts of boric acid or the oxides of boron.

A solution is prepared comprising concentrated sulfuric acid and boric acid or its equivalent, preferably in the proportion of approximately one liter of sulfuric acid and fifty (50) grams of boric acid, although the exact proportion of boric acid is not critical.

Glass treated with a reflection reducing film of magnesium fluoride, for example, is then immersed in the solution.

The solution into which the glass has been immersed is then preferably heated to a temperature of approximately 100° C., or until white fumes commence to appear over the solution. The appearance of the fumes is a convenient indicator that a proper temperature has been reached. The source of heat is then removed and the solution is preferably allowed to cool to room temperature before the glass is removed in order to prevent thermal shock to the glass.

The sulfuric acid dissolves the magnesium fluoride and effectively removes the coating from the glass. The reaction products are prevented from reacting adversely with the glass by the preferential reaction with the boric acid.

The glass may then be retreated or recoated with magnesium fluoride or other suitable reflection reducing film coating material, and it is found that the optical properties of the glass are not affected or impaired.

*Example II*

As an alternative to Example I, a solution of perchloric acid ($HClO_4$) having an initial concentration of about 60% may be employed as a reagent for dissolving magnesium fluoride film coatings from glass. Boric acid is employed as an inhibitor as before.

The proportions and conditions are preferably about the same as in Example I, that is to say, a solution of one liter perchloric acid reagent and approximately fifty (50) grams of boric acid inhibitor is suitable, and heating to a temperature of approximately 100° C. produces satisfactory results in removing the film coatings without damaging the glass.

*Example III*

It may be desirable in some instances to use phosphoric acid ($H_3PO_4$) as a reagent along with boric acid as an inhibitor. In such cases glass coated with a reflection reducing film, such as magnesium fluoride, is immersed and heated in a phosphoric acid and boric acid solution, the proportions preferably being about the same as in the other examples given, namely, about one liter of phosphoric acid reagent and about fifty grams of boric acid inhibitor. The film coating is attacked and dissolved by the solvent, when the solution is heated to approximately 100° C., but the inhibitor prevents damage to the glass.

We find that it is also possible to employ other mineral acids such as nitric acid ($HNO_3$) or hydrochloric acid (HCl) as solvents with boric acid as an inhibitor, although the preferred reagents are those stated in the examples.

The solvent and the method are particularly adapted to remove film coatings of magnesium fluoride or perhaps other fluoride coatings from glass. However, it is obvious that the methods and solvents could be used for removing film coatings of other materials.

From the foregoing, it is apparent that we have provided an effective solvent and an advantageous method of using the same whereby hard reflection reducing film coatings of magnesium fluoride may be successfully removed from glass treated therewith without harm to the optical properties of the glass itself.

While we have disclosed certain ingredients and proportions thereof that give good results, such ingredients and proportions may be varied within reasonable limits. We, therefore, do not wish to be limited to the exact ingredients and proportions specified but only by the scope of the appended claims.

The invention described herein may be manufactured and used by or for the Government of the United States of America for governmental purposes without the payment of any royalties thereon or therefor.

We claim:

1. A solvent for magnesium fluoride reflection reducing glass coatings consisting essentially of concentrated sulfuric acid and boric acid in the approximate proportion of fifty (50) grams boric acid to one (1) liter concentrated sulfuric acid.

2. The method of removing magnesium fluoride containing reflection reducing coatings from glass comprising immersing the coated glass in a solution comprising concentrated sulfuric acid and boric acid in the proportions of approximately fifty grams of boric acid to one liter of sulfuric acid whereby the coating is dissolved by the sulfuric acid and the reaction between the glass and the first reaction products is inhibited by the boric acid.

3. The method of removing coatings from glass used for optical purposes comprising forming a solution of a mineral acid selected from the group consisting of sulfuric, perchloric, phosphoric, nitric and hydrochloric acids and an inhibitor comprising boric acid in the approximate proportion of about fifty (50) grams inhibitor to about one (1) liter of mineral acid, immersing the glass in said solution and heating said solution to a temperature of about 100° C., removing the source of heat, and allowing the solution to cool to room temperature before removing the glass from the solution to avoid thermal shock to the glass.

ARVID GRENSTAD.
ROBERT B. CALLISON.

REFERENCES CITED

The following references are of record in the file of this patent:

UNITED STATES PATENTS

| Number | Name | Date |
| --- | --- | --- |
| 1,077,860 | Schroer | Nov. 4, 1913 |
| 1,306,505 | Ueda | June 10, 1919 |
| 2,256,449 | George | Sept. 16, 1941 |
| 2,337,460 | French | Dec. 21, 1943 |
| 2,370,214 | Walker | Feb. 27, 1945 |
| 2,382,660 | Penberthy | Aug. 12, 1945 |

FOREIGN PATENTS

| Number | Country | Date |
| --- | --- | --- |
| 408,859 | Great Britain | Apr. 19, 1934 |